(12) United States Patent
Simantov (10) Patent No.: US 11,165,324 B1
(45) Date of Patent: Nov. 2, 2021

(54) MAGNET-BASED GENERATOR (71) Applicant: POWER OF NATURE LTD., Kfar Tavor (IL)

(72) Inventor: Binyamin Simantov, Kfar Tavor (IL)

(73) Assignee: POWER OF NATURE LTD., Kfar Tavor (IL)

( * ) Notice: Subject to any disclaimer, the term of this patent is extended or adjusted under 35 U.S.C. 154(b) by 0 days.

(21) Appl. No.: 17/189,921

(22) Filed: Mar. 2, 2021

(30) Foreign Application Priority Data

Aug. 3, 2020 (IL) .......................................... 276477

(51) Int. Cl.
*H02K 35/02* (2006.01)
*F03G 7/08* (2006.01)
*H02K 7/18* (2006.01)

(52) U.S. Cl.
CPC ............... *H02K 35/02* (2013.01); *F03G 7/08* (2013.01); *H02K 7/1876* (2013.01)

(58) Field of Classification Search
CPC ......... H02K 35/02; H02K 7/1876; F03G 7/08
See application file for complete search history.

(56) References Cited

U.S. PATENT DOCUMENTS 10,644,564 B1 * 5/2020 Harper ................ H02K 21/028
2012/0062048 A1 3/2012 Kaneko

* cited by examiner

*Primary Examiner* — Viet P Nguyen
(74) *Attorney, Agent, or Firm* — William H. Dippert; Laurence A. Greenberg; Werner H. Stemer (57) ABSTRACT

A magnets-based generator is disclosed that comprises a stagnant-magnet anchored to a chassis; a wandering-magnet that is designated to be propelled from a first position to a second position and vice versa; an E-magnet and a J-magnet disposed adjacent to one end of the wandering-magnet; and at least one pair of buffers disposed between the stagnant-magnet and another end of the wandering-magnet. The wandering-magnet moves from the first position to the second position by joining the E-magnet and the J-magnet together and splitting the pair of buffers apart, and it moves from the second position to the first position by splitting the E-magnet and the J-magnet apart and joining the pair of buffers together. The generator further comprises an energy converter adapted to generate electrical energy from movements of the wandering-magnet from the first position to the second position and vice versa.

16 Claims, 6 Drawing Sheets

MAGNET-BASED GENERATOR

CROSS-REFERENCE TO RELATED PATENT APPLICATION

This patent application is based upon and claims the priority of co-pending, commonly assigned Israeli Patent Application No. 276477, filed Aug. 3, 2020, which is incorporated herein by reference in its entirety.

TECHNICAL FIELD OF THE INVENTION

The present disclosed subject matter relates to renewable energy. More particularly, the present disclosed subject matter relates to a system that utilizes permanent magnets for generating electrical energy.

BACKGROUND OF THE INVENTION

For some time, considerable progress has been made in harvesting various renewable energies, such as solar energy and wind energy. However, the use of wind turbines and solar panels involves complications due to the size of such systems. Additionally, solar energy or wind energy has to be converted into electricity that needs to be stored in a large number of electric batteries that introduce recycling issues of the batteries.

Nature's limitations, i.e., wind or sun presence lead to dependence on batteries for storing the harvested energy for addressing power needs all throughout the day and throughout the seasons of the year.

Due to the high costs of infrastructure and large real-estate, required by these renewable energy systems that are known in the art, they are designed with the intention of supplying its generated power to utility grids. Thus, denying the viability and ability to utilize renewable energy for local and small needs.

BRIEF SUMMARY OF THE INVENTION

According to a first aspect of the present disclosed subject matter, a magnets-based generator is provided that comprises: a stagnant-magnet anchored to a chassis of the magnets-based generator; a wandering-magnet designated to be propelled from a first position to a second position and vice versa; an E-magnet and a J-magnet disposed adjacent to one end of the wandering-magnet; at least one pair of buffers disposed between the stagnant-magnet and an opposite end of the wandering-magnet; wherein the wandering-magnet is propelled from the first position to the second position by joining the E-magnet and the J-magnet together and splitting the at least one pair of buffers apart; wherein the wandering-magnet propel from the second position to the first position splitting the E-magnet and the J-magnet apart and joining the at least one pair of buffers together; an energy converter adapted to generate electrical energy resulting from movements of the wandering-magnetic from the first position to the second position and vice versa; and a controller configured to control the movements of the wandering-magnetic from the first position to the second position and vice versa.

In some exemplary embodiments, joining the E-magnet and the J-magnet together forms a Gemini magnet.

In some exemplary embodiments, splitting the at least one pair of buffers apart the stagnant-magnet and the wandering-magnet repel each other and joining the E-magnet and the J-magnet together cause the wandering-magnet and the Gemini magnet to be attracted to each other, thereby propelling the wandering-magnet from the second position to the first position.

In some exemplary embodiments, joining the at least one pair of buffers together cause the wandering-magnet to be attracted to the at least one pair of buffers and splitting the E-magnet and the J-magnet apart weaken an attraction between the wandering-magnet and the Gemini magnet, thereby propelling the wandering-magnet from the first position to the second position.

In some exemplary embodiments, the magnets-based generator further comprises a plurality of Gemini's linear actuators configured to form the Gemini-magnet by sliding the J-magnet and the E-magnet to each other and splitting the Gemini-magnet by sliding the J-magnet and the E-magnet away from each other along at least one Gemini shaft.

In some exemplary embodiments, the magnets-based generator further comprises a plurality buffer's linear actuators configured to split the at least one pair of buffers apart by sliding the buffers away from each other and joining the at least one pair of buffers together by sliding the buffers toward each other along at least one buffers shaft.

In some exemplary embodiments, the plurality of buffer's linear actuators and the plurality of Gemini's linear actuators are selected from a group consisting of a linear motor; a screw motor assembly; and a combination thereof.

In some exemplary embodiments, the magnets-based generator further comprises a plurality of pullies supporting a plurality of belts that connect the at least one pair of buffers to the Gemini magnet, wherein the buffers assist in splitting the Gemini magnet to the E-magnet and the J-magnet.

In some exemplary embodiments, the magnets-based generator further comprises a plurality of gas spring disposed of parallel to the buffers' shaft, wherein at least one gas spring of the plurality of gas spring is connected between one side of the chassis and one buffer of the pair of buffers that is closer to an opposite side of the chassis, and wherein another at least one gas spring of the plurality of gas spring is connected between the opposite side of the chassis and a second buffer of the pair of buffers that is closer to the one side of the chassis.

In some exemplary embodiments, the plurality of gas springs is compressed by the at least one pair of buffers while joining together, and wherein the plurality of gas springs are extracted to assist in splitting the at least one pair of buffers apart.

In some exemplary embodiments, the wandering-magnet is connected to a carriage forming together a wandering-magnet sub-assembly capable of sliding from the first position to the second position and vice versa along carriage rails.

In some exemplary embodiments, the magnets-based generator further comprises a plurality of carriage gas springs configured to accumulate energy while the wandering-magnet sub-assembly moves from the second position to the first position and provide its energy to assist propelling the wandering-magnet sub-assembly from the first position to the second position.

In some exemplary embodiments, the magnets-based generator further comprises a member connecting between the carriage and the energy converter, thereby following the movements of the wandering-magnetic from the first position to the second position and vice versa.

In some exemplary embodiments, the energy converter comprising a linear to rotational gear configured to convert back and forth movements of the member for rotating a rotor of an alternator.

In some exemplary embodiments, the energy converter further comprises a unidirectional bearing and a spiral spring configured to accumulate energy provided via the member for maintaining a continuous rotational speed of the rotor.

In some exemplary embodiments, the controller sequentially controls the sliding of the plurality of buffer's linear actuators and the plurality of Gemini's linear actuators.

In some exemplary embodiments, the controller comprising a rectifier and a regulator configured to regulate charging current to batteries that are used for storing energy.

In some exemplary embodiments, the magnets-based generator further comprises an auxiliary magnet configured to assist the Gemini magnet in propelling the wandering magnet from the second position to the first position.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION OF THE INVENTION

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments unless the embodiment is inoperative without those elements.

Referring now to FIGS. 1 to 4 illustrating a frontal view and a side view of a magnet-based generator in a first position and a second position, respectively, in accordance with some exemplary embodiments of the disclosed subject matter. The magnet-based generator (MBG) 100 is a self-contained apparatus incorporated within chassis 101 designed to store its yielded energy in batteries.

Figure 6:
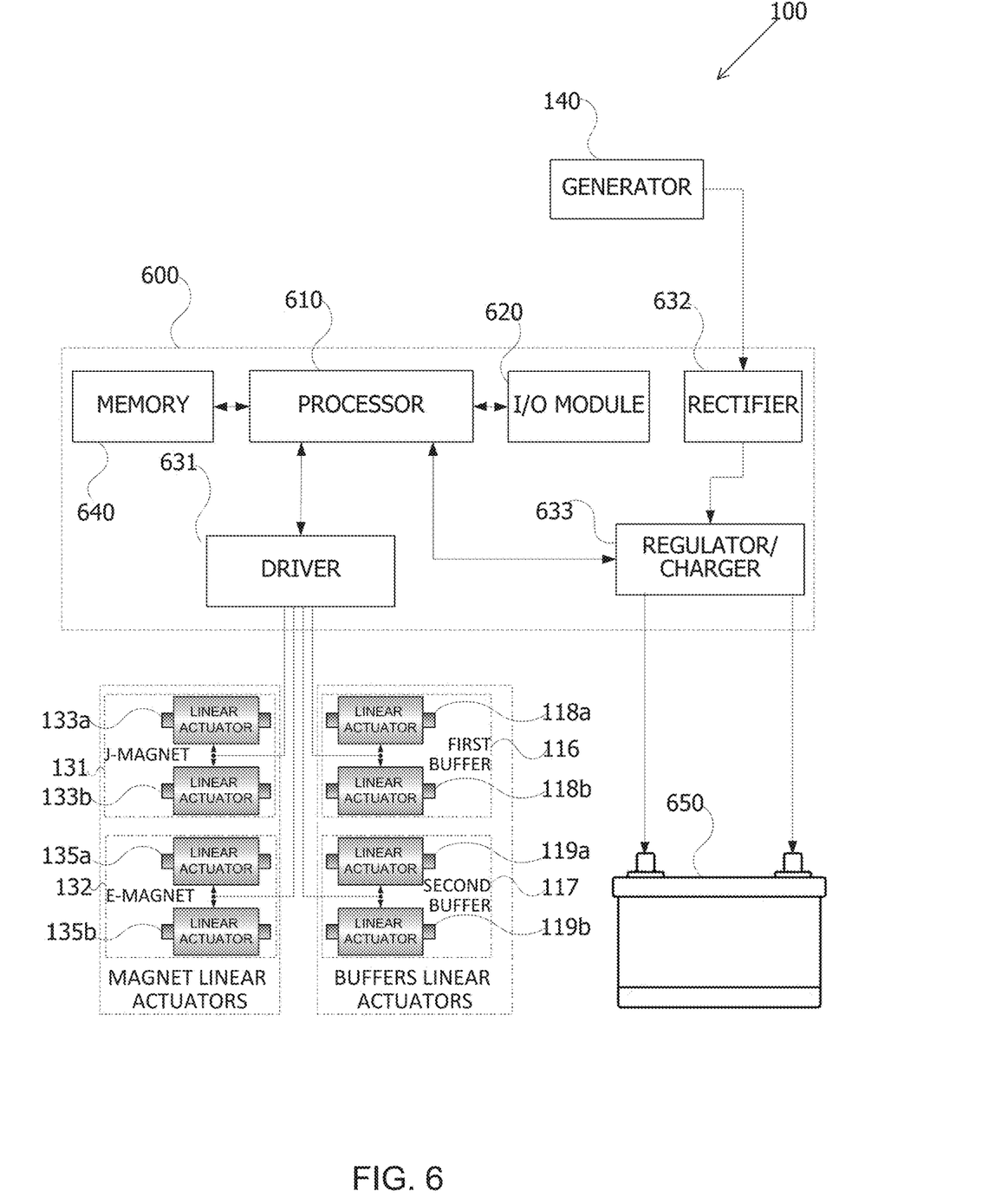
FIG. 6 shows a block diagram of a controller of the magnet-based generator, in accordance with some exemplary embodiments of the disclosed subject matter.

In some exemplary embodiments, the energy stored in batteries of the MBG100, showed in FIG. 6, can be connected to an inverter that converts the stored energy to AC suitable for and residential or commercial electrical networks, thereby utilizing the MBG100 as an AC generator. Additionally, or alternatively, the MBG100 can be adapted to be installed in an electric vehicle to be used for charging batteries of the electrical vehicle.

In some exemplary embodiments, the MBG 100 can be placed on a horizontal surface in orientation, such as depicted in FIGS. 1-4, yet the MBG 100 can also be placed on any one of its sides or upside-down with respect to the orientation depicted in FIGS. 1-4.

In some exemplary embodiments, the MBG 100 is comprised of the following four sub-assemblies: a stagnant-magnet assembly; a wandering-magnet assembly; a Gemini-magnet assembly; and an energy converter 140.

In some exemplary embodiments of the disclosed subject matter, the stagnant-magnet sub-assembly comprises: two buffer shafts 103, each anchored on both sides to chassis 101; a stagnant-magnet 110 anchored to chassis 101; two gas spring 112 connected on one end to chassis 101 and to a sliding buffer 117 on their opposite end by bracket 115; two gas spring 113 connected on one end to chassis 101 and to a sliding buffer 116 on their opposite end by bracket 113; two buffer's linear actuators 118 connected to sliding buffer 116 and fitted on buffers shafts 103; and two buffer's linear actuators 119 connected to sliding buffer 117 and fitted on buffers shafts 103.

It should be noted that the gas springs can be any resilient element or other technological element that can accumulate and store potential energy and releases the energy when it is needed. In this case, the gas springs were merely provided as an example, but any device that is able to accumulate and store potential energy and release it upon instruction can be used, such as force springs, electrostatic generator, elastic force, or any other means that is able to release its stored energy.

Figure 1:
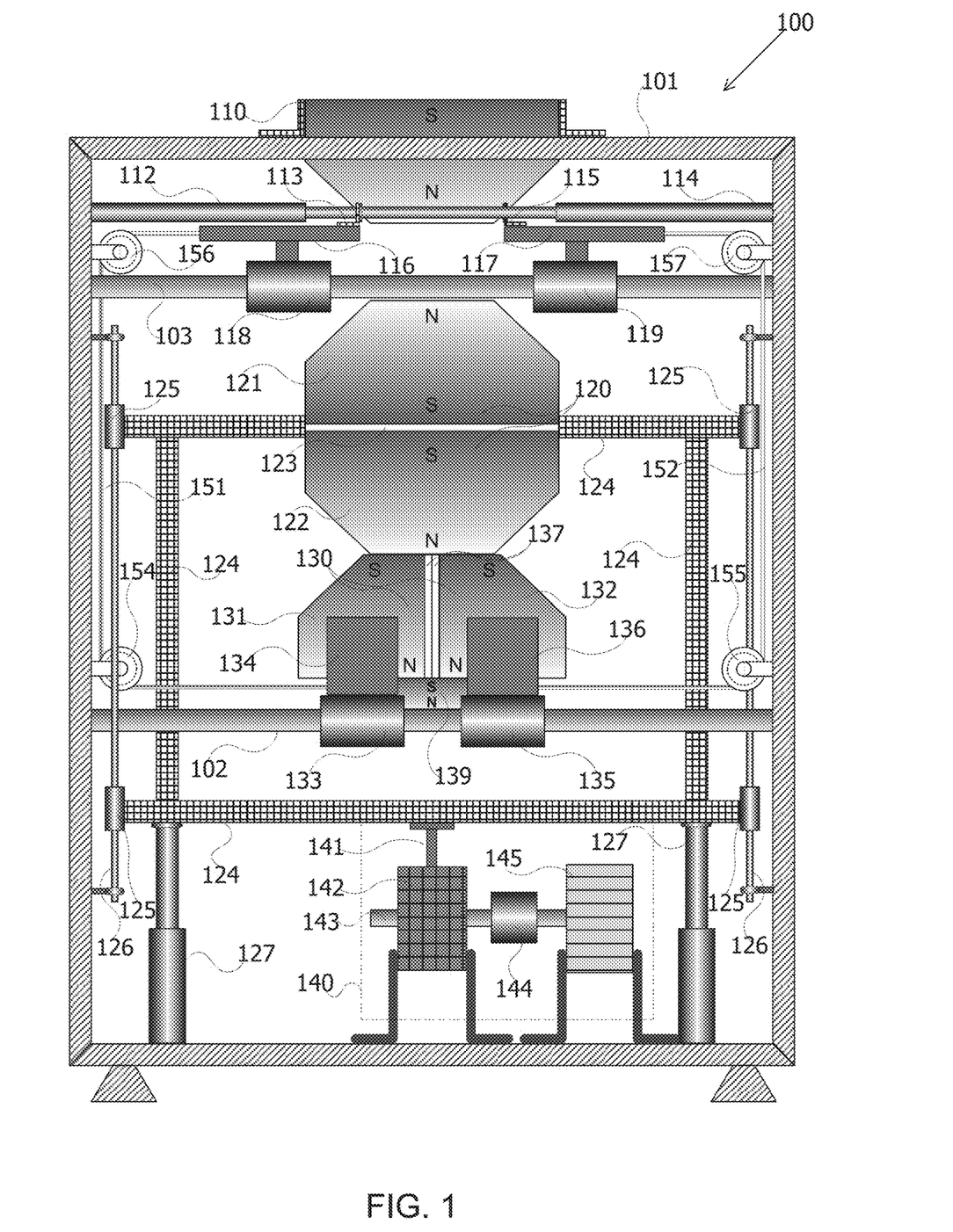
FIG. 1 illustrates a frontal view of a magnet-based generator in a first position, in accordance with some exemplary embodiments of the disclosed subject matter.
Figure 2:
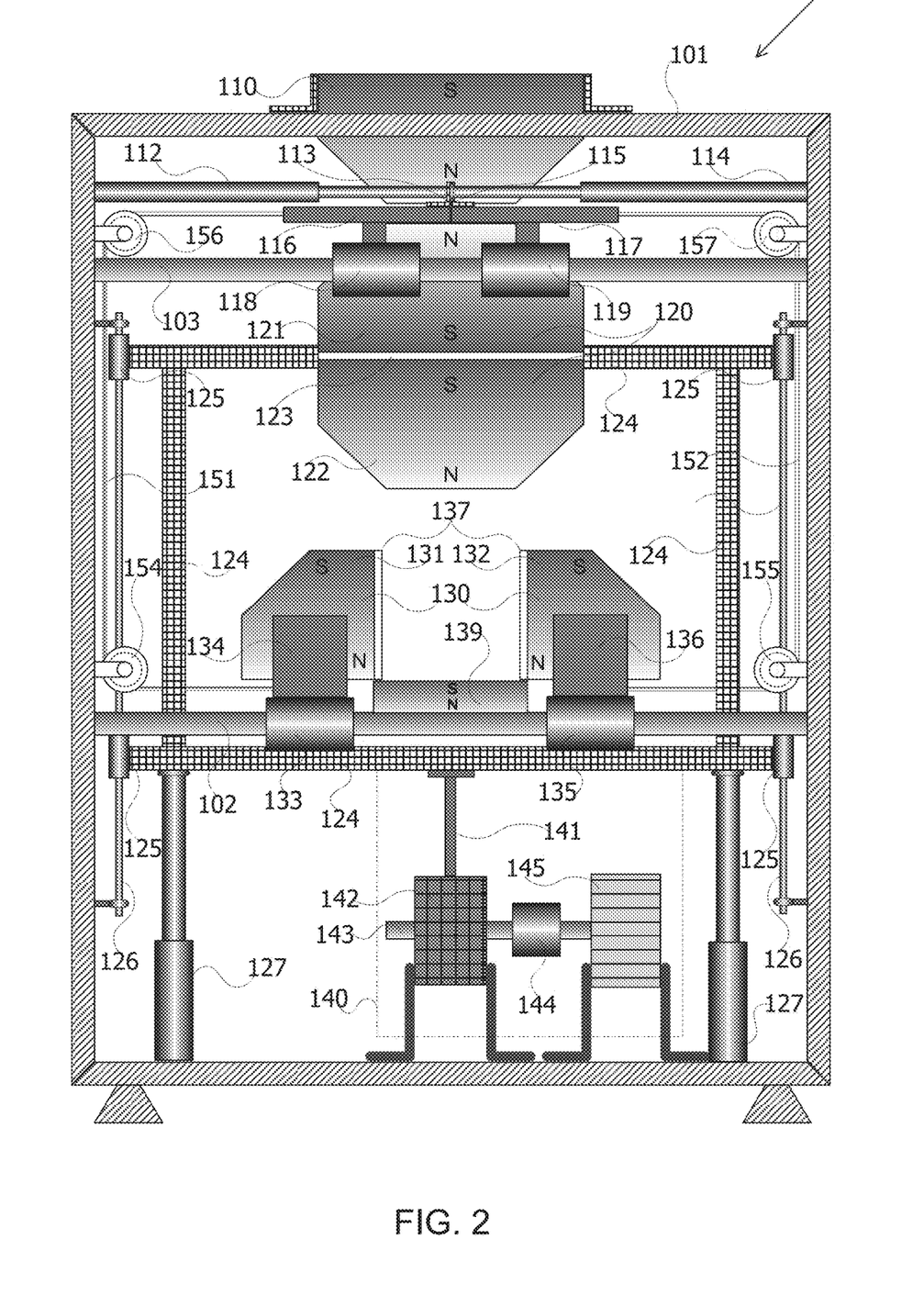
FIG. 2 illustrates a frontal view of the magnet-based generator of FIG. 1, in a second position, in accordance with some exemplary embodiments of the disclosed subject matter.

In some exemplary embodiments of the disclosed subject matter, the wandering-magnet sub-assembly comprises: a wandering magnet 120 mechanically connected to carriage 124, which preferably comprises eight sleeves 125, one at each corner of the carriage 124; four carriage rails 126 are connected to chassis 101 and are fitted inside sleeves 125 so that the carriage 124 can slide along rails 126, as depicted in FIGS. 1 and 2; and four carriage gas springs 127 encored to chassis 101, in line with carriage 124, and are used to absorb, and retain, impact energy from the moving carriage 124.

In some exemplary embodiments, the wandering magnet 120 is comprised of two identical magnets, i.e., a first wandering magnet 121 and a second wandering magnet 122, that are mechanically connected together with an absorber 123 between them. The absorber 123 is used as a partition between the south poles of magnet 121 and magnet 122. In some exemplary embodiments, magnet 121, absorber 123, and magnet 122 can be permanently connected by glue or any other mechanical connection known in the art. It should be noted that the magnet 121 form together with absorber 123 and magnet 122 the wandering magnet 120 having a north side and an opposite north side.

Figure 3:
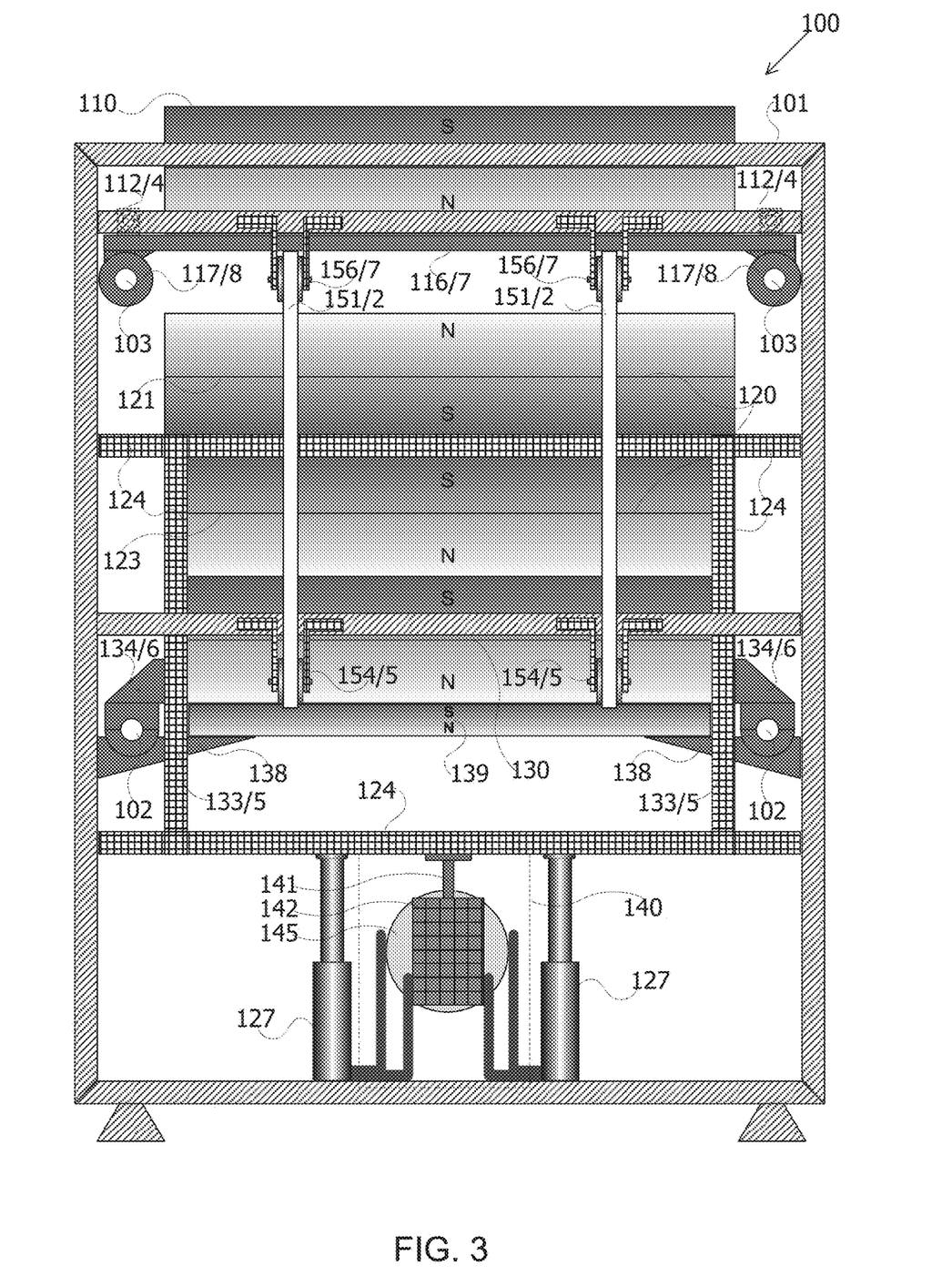
FIG. 3 illustrates a side view of the magnet-based generator of FIG. 1, in the first position, in accordance with some exemplary embodiments of the disclosed subject matter.
Figure 4:
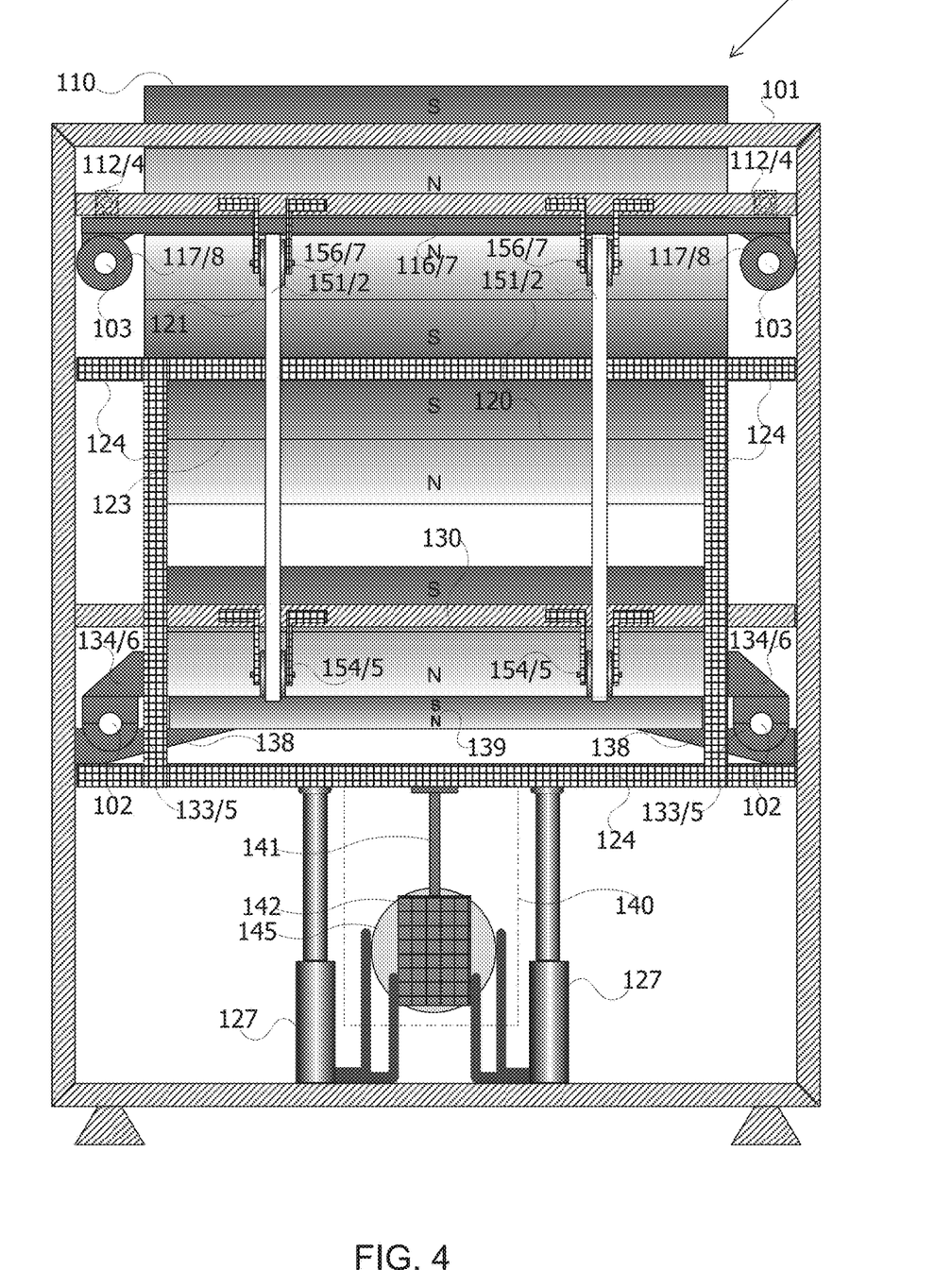
FIG. 4 illustrates a side view of the magnet-based generator of FIG. 1, in the second position, in accordance with some exemplary embodiments of the disclosed subject matter.

In some exemplary embodiments of the disclosed subject matter, the Gemini-magnet sub-assembly comprises: a Gemini-magnet 130 constituted of a sliding J-magnet 131 and a sliding E-magnet 132; two Gemini's linear actuators 133 connected by two connectors 134 to the J-magnet 131 and configured to slide along two Gemini shafts 102; two Gemini's linear actuators 135 connected by two connectors 136 to E-magnet 132 and configured to slide along the two Gemini shafts 102; an auxiliary magnet 139 permanently connected to the chassis 101 by supports 138 (as shown in FIGS. 3 and 4); two belts 151, supported by two pulleys 156 and two pulleys 154, used for connecting the buffer 116 with the two connectors 134; and two belts 152, supported by two pulleys 157 and two pulleys 155, used for connecting the buffer 117 with the two connectors 136.

In some exemplary embodiments of the disclosed subject matter, the energy converter sub-assembly 140 comprises: a member 141 connected on one end to the carriage 124 and to a gear 142 on its opposite end; an axle 143 rotated by gear 142 that rotates a rotor (not shown) of an alternator 145 via a bearing 144.

In some exemplary embodiments, magnet 110, magnet 121, and magnet 122 have substantially a similar form, size, and weight, whereas identical magnets 131 and 132 are each having substantially half the size and weight of the above-mentioned magnets. It should be noted that each of these permanent magnets is formed of a plurality of magnets arranged in a Halbach array formation designed for augmenting the magnetic field on a particular side of the array. In some exemplary embodiments, the Halbach array of magnets 110, 121, and 122 are designed to augment the magnetic field at their north side, whereas the Halbach array of magnets 131, and 132 are designed to augment the magnetic field at their south side.

In some exemplary embodiments, the sliding buffers 116 and 117, absorber 123, and absorbers 137 are made of Cobalt-Iron alloys, such as VACOFLUX®50 or VACODUR® that are characterized by magnetic saturation above 2 Tesla; thus, suitable for applications where high flux density is required. In some exemplary embodiments, the sliding buffers 116 and 117, absorber 123, and absorbers 137 can have a thickness of 10 to 30 millimeters. The area of absorber 123 matches the south end areas of both magnets 121 and 122. The area of sliding buffers 116 and 117 together are overlapping with the north end area of magnet 110 and areas of absorbers 137 match an area of magnets 131, and 132 sides as depicted in FIGS. 1 and 2.

In some exemplary embodiments, the sliding buffers 116 and 117 are configured to buffer between magnet 110 and magnet 120 by absorbing the magnetic field of magnet 110; absorbers 137 are configured to facilitate drawing magnets 131 and 132 together; absorber 123 is configured to facilitate the attachment of magnets 121 and 122 on their south pole.

In some exemplary embodiments, both surfaces of each buffer comprise a plurality of spheres that are embedded in them, for the sake of facilitating the buffers sliding in view of the forces exerted on them by magnets 110 and 120 from each surface.

In some exemplary embodiments, operating the magnet-based generator 100 involves propelling the wondering magnet 120 together with carriage 124 from a first position to a second position and vice versa. In the $1^{st}$ position, which is also an idle position, i.e. the MBG 100 is off, magnet 120 is tight to Gemini magnet 130, such as depicted in FIGS. 1 and 3. In the $2^{nd}$ position, magnet 120 is tight to sliding buffers 116 and 117 and thereby to magnet 110, such as depicted in FIGS. 2 and 4. In some exemplary embodiments, member 141 follows the back and forth movement of carriage 124 (i.e. from the first position to the second position and vice versa) and passes kinetic energy of the movements of carriage 124 to converter 140 that is configured to generate electrical power from kinetic energy.

In some exemplary embodiments of the $1^{st}$ position, as depicted in FIGS. 1 and 3, the following features can be observed:

a. The sliding buffers 116 and 117, which are coupled with actuators 118 and 119, respectively, are kept apart (away) from one another;

b. The two gas springs 112 and the two gas springs 114 are in a resting state, i.e. not retaining energy;

c. The four gas springs 127 are in a compressed state, i.e. retaining energy;

d. J-magnet 131 coupled with two actuators 133 and E-magnet 132 coupled with two actuators 135 are in a shut position, i.e. magnet 131 and magnet 132 are tight to each other to form the Gemini magnet 130;

e. Magnet 120 is tight to Gemini magnet 130;

f. Member 141 is pushed all the way into gear 142; and g. Belts 15 land 152 are in rest mode.

In some exemplary embodiments of the $2^{nd}$ position, as depicted in FIGS. 2 and 4, the following occurs:

a. The sliding buffers 116 and 117 coupled with actuators 118 and 119, respectively, are closed together;

b. The two gas springs 112 and the two gas springs 114 are in a compressed state, i.e.
retaining energy;

c. The four gas springs 127 are in a resting state, i.e. not retaining energy;

d. J-magnet 131 is coupled with two actuators 133 and E-magnet 132 is coupled with two actuators 135, are in an open position, i.e. magnet 131 and magnet 132 are apart from each other;

e. Magnet 120 is tight to sliding buffers 116 and 117 and thereby to magnet 110;

f. Member 141 is pulled all the way out of gear 142; and g. Belts 15 land 152 are in pull mode.

In some exemplary embodiments, the buffer's linear actuators 118 and 119 or the Gemini's linear actuators 133 and 135 can be a linear motor having an electric motor that has its stator (shaft 103 or 102) and rotor (actuators 118, 133, 119, and 135) unrolled; thus, instead of producing a rotational torque, it produces a linear force that moves the actuators along the length of the shafts (102 or 103). It should be noted that in such embodiment shafts 103 and/or 102 incorporate permanent magnets.

Additionally, or alternatively, any one of either buffer's linear actuators 118 and 119 or Gemini's linear actuators 133 and 135 can be implemented using a conventional screw motor assembly, comprising a lead screw; a motor; a ball bearing; a regular nut; a reverse thread nut; and guide-rails. In such exemplary embodiment, shafts 103 or 102 can be replaced by the lead screw that moves the sliding buffers and/or connectors, and guides rails that support the sliding buffers and/or connectors. One end of the lead screw is driven by the motor and its opposite end is supported by ball-bearing. Connector 136, as well as buffer 117, can be connected, for example, to the screw motor assembly by the regular nut that moves along the lead screw in one direction, whereas connector 134 and buffer 116 can be connected to the assembly by the reverse thread nut that moves along the lead screw in an opposite direction.

In some exemplary embodiments, transition from the $1^{st}$ position to the $2^{nd}$ position (i.e., propelling the wondering magnet 120 together with carriage 124 towards magnet 110) comprises: separating J-magnet 131 and E-magnet 132 apart to open position using the two actuators 133 and the two actuators 135, respectively; and simultaneously closing sliding buffers 116 and 117 together using actuators 118 and 119, respectively.

Separating J-magnet 131 from E-magnet 132 weakens the magnetic field between magnet 130 and magnet 120, whereas closing the clearance between buffer 116 and buffer 117, strengthens the magnetic field between magnet 120 and the buffers, thus, leading to transitioning from the $1^{st}$ position to the $2^{nd}$ position, i.e. propelling magnet 120 from magnet 130 to magnet 110.

In some exemplary embodiments, closing buffers 116 and 117 assists actuators 133 and 135 in separating J-magnet 131 from E-magnet 132 by means of belts 151 and 152. Additionally, or alternatively, the transition from 1st position to 2nd position process is further facilitated by the four gas springs 127 that release their retained energy while moving from compressed to rest state. It should be noted that the two gas springs 112 and the two gas springs 114 are compressed, i.e. charged with energy, by buffers 116 and 117 energy while moving inward.

In some exemplary embodiments, transition from the $2^{nd}$ position to the $1^{st}$ position (i.e., propelling the wondering magnet 120 together with carriage 124 towards magnet 130) comprises: reforming the Gemini magnet 130 by shutting the gap between J-magnet 131 and E-magnet 132 using the two actuators 133 and the two actuators 135, respectively; and simultaneously separating the sliding buffer 116 and sliding buffer 117 apart using actuators 118 and 119, respectively.

Closing the gap between J-magnet 131 and E-magnet 132 strengthens the magnetic field between magnet 130 and magnet 120, whereas separating the sliding buffer 116 and buffer 117 apart weakens the magnetic field between magnet 120 and the buffers; thus, leading to transition from the $2^{nd}$ position to the $1^{st}$ position, i.e., propelling magnet 120 from magnet 110 to magnet 130.

In some exemplary embodiments, the compressed gas springs 112 and 114 assist actuators 118 and 119 in separating buffers 116 and 117 apart by releasing their retained energy. It will be appreciated that separating buffers 116 and 117 apart exposes a north side of magnet 120 to the north side of magnet 110, which causes them to repel each other, i.e. propelling carriage 124 away from the $2^{nd}$ position. Furthermore, an opposite north side of magnet 120 faces the closing south side of magnet 130 assisted by auxiliary magnet 139. Thereby, attracting magnet 120 and further assisting in propelling the carriage 124, in the transition from the $2^{nd}$ position to the $1^{st}$ position and compress all gas springs 127.

Figure 5A:
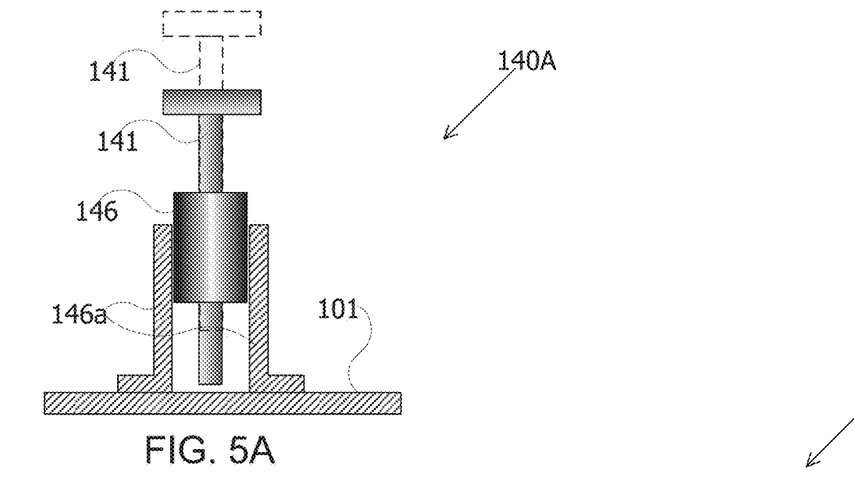
FIG. 5A illustrates a frontal view of an energy converter of the magnet-based generator, in accordance with some exemplary embodiments of the disclosed subject matter.

FIG. 5A illustrates a frontal view of an energy converter of the magnet-based generator, in accordance with some exemplary embodiments of the disclosed subject matter. An energy converter 140A can be a linear alternator adapted for converting kinetic energy to electrical energy, i.e. alternating current (AC). The linear alternator is based on the principle of electromagnetic induction for converting kinetic energy caused by the back and forth movement of member 141 inside coil 146 to electrical energy. In some exemplary embodiments, the member 141, propelled by carriage 124, can be a combination of ferromagnetic material and permanent magnet.

Figure 5B:
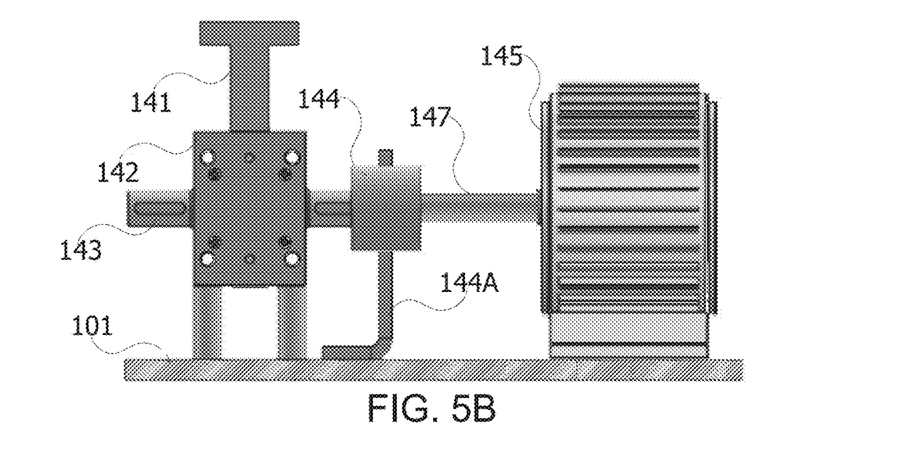
FIG. 5B illustrates a frontal view of another energy converter of the magnet-based generator, in accordance with some exemplary embodiments of the disclosed subject matter.

FIG. 5B illustrates a frontal view of another energy converter of the magnet-based generator, in accordance with some exemplary embodiments of the disclosed subject matter. An energy converter 140B comprises: a member 141 propelled by the back and forth movements of carriage 124; a linear to rotational gear 142 that converts, for example, one linear stroke of member 141 to twenty rotations of axis 143; a bearing 144 coupled between axis 143 of gear 142, with an axis 147 of alternator 145. In some exemplary embodiments, the back and forth movements (strokes) of member 141 rotates, by means of axis 147, a rotor of the alternator 145 clockwise when member 141 is pushed in and counterclockwise when member 141 is and thereby generating AC power.

Additionally, or alternatively, bearing 144 can be a unidirectional bearing allowing only one rotational direction (clockwise or counterclockwise) of axis 147 of alternator 145, so that the generator rotates when carriage 124 pushes member 141 into gear 142.

Figure 5C:
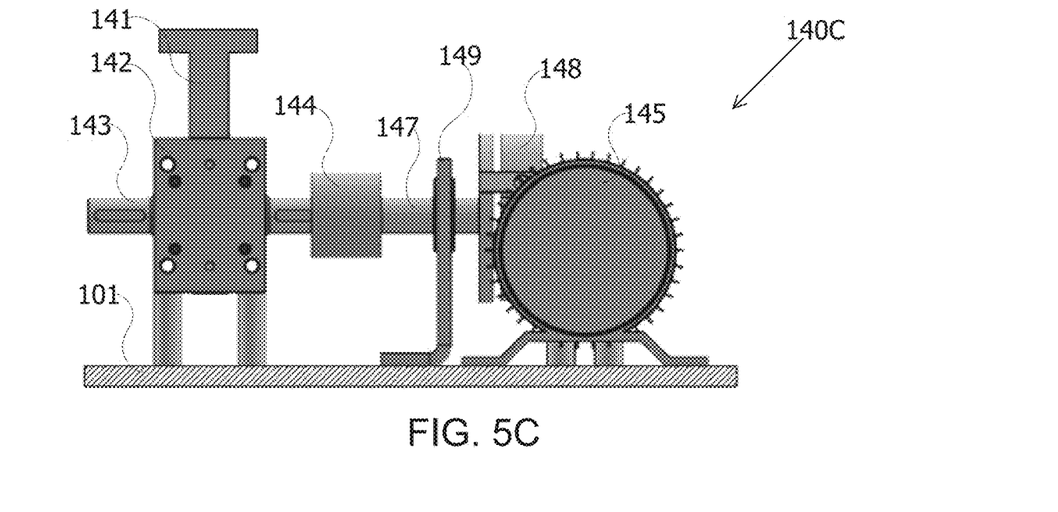
FIG. 5C illustrates a frontal view of yet another energy converter of the magnet-based generator, in accordance with some exemplary embodiments of the disclosed subject matter.

FIG. 5C illustrates a frontal view of yet another energy converter of the magnet-based generator, in accordance with some exemplary embodiments of the disclosed subject matter. An energy converter 140C comprises: a member 141 propelled by the back and forth movement of carriage 124; a linear to rotational gear 142 that converts the linear movement of member 141 to rotational movement of axis 143; a unidirectional bearing 144 that is coupled between axis 143 and axis 147; a clutch 147; and spiral spring 148 driven by axis 147 and adapted to rotate a rotor of generator 145.

In some exemplary embodiments, bearing 144 allows axis 147 to rotate only in one direction for driving/loading spiral spring 148 that serves as energy accumulator. It should be noted that in the embodiment depicted in FIG. 5C, axis 143 turns in one direction, e.g. clockwise, when member 141 is pushed in and while member 141 is pulled out, axis 143 turns in an opposite direction, e.g. counterclockwise. Thus, it will be appreciated that axis 147 is rotated only when member 141 is pushed in, clockwise according to the example.

In some exemplary embodiments, clutch 149 can be used to prevent the spiral spring 148 from rotating axis 147, i.e., waste its accumulated energy, when the unidirectional bearing 144 doesn't rotate axis 147, i.e., when member 141 is pulled up. After the spiral spring 148 accumulated sufficient energy, e.g., after member 141 was pushed in at least three times, spring 148 exerts its energy to rotate the rotor of alternator 145 while axis 147 keeps loading spring 148 when member 141 is pushed in. It will be appreciated that spiral spring 148 is used in the present disclosure as an energy accumulator.

Referring now to FIG. 6 showing a block diagram of a controller of the magnet-based generator, in accordance with some exemplary embodiments of the disclosed subject matter. A controller 600 can be a computerized device adapted to control electrical elements of the MBG100 and as well as shaping their outcomes.

In some exemplary embodiments, controller 600 comprises a processor 610. Processor 610 can be a central processing unit (CPU), a microprocessor, an electronic circuit, an integrated circuit (IC) or the like. Additionally, or alternatively, controller 600 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processor 610 can be utilized to perform computations required by controller 600 or any of its subcomponents.

In some exemplary embodiments of the disclosed subject matter, controller 600 comprises an input/output (I/O) module 620. Controller 600 can utilize I/O Module 620 as an interface to transmit and/or receive information and instructions between controller 600 and external I/O devices, such as a smartphone, a notebook, a tablet PC, a desktop computer, the Internet and any combination thereof, or the like.

In some exemplary embodiments, I/O module 620 can be used to provide an interface to a user of the MBG100, such as by providing output, visualized results, reports, or the like. The user can use an external I/O device to input the information involving the MBG100 operation. However, it will be appreciated that MBG100 can be automatically operated without human involvement.

In some exemplary embodiments of the disclosed subject matter, controller 600 comprises a driver 631. Driver 631 is configured to electrically activate actuators 133 and 135 for opening and shutting a gap between J-magnet 131 and E-magnet 132, respectively. Driver 631 is also configured to electrically activate actuators 118 and 119 for opening and closing the clearance between 116 and 117, respectively.

In some exemplary embodiments of the disclosed subject matter, controller 600 comprises a rectifier 632 that utilizes a half bridge, a full bridge, and any combination thereof, for rectifying the AC voltage provided by generator 140.

In some exemplary embodiments of the disclosed subject matter, controller 600 comprises a regulator 633 configured to regulate rectified voltage, provided by rectifier 632, for charging at least one battery 650 that stores energy provided by the generator.

In some exemplary embodiments, controller 600 comprises a memory unit 640. Memory unit 640 can be persistent or volatile. For example, memory unit 640 can be a flash disk, a random-access memory (RAM), a memory chip, a magnetic storage device such as a hard disk; a semiconductor storage device such as flash memory, or the like. In some exemplary embodiments, memory unit 640 may retain program code to activate processor 610 to perform acts associated with operating the MBG100.

The components detailed below can be implemented as one or more sets of interrelated computer instructions, executed for example, by processor 610 or by another processor. The components can be arranged as one or more executable files, dynamic libraries, static libraries, methods, functions, services, or the like, programmed in any programming language and under any computing environment.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A magnets-based generator comprising:
a stagnant-magnet anchored to a chassis;
a wandering-magnet having an end and an opposite end, wherein the wandering magnet is designated to be propelled from a first position to a second position and vice versa,
wherein the wandering-magnet is connected to a carriage forming together a wandering-magnet sub-assembly capable of sliding from the first position to the second position and vice versa along carriage rails;
an E-magnet and a J-magnet disposed adjacent to the end of the wandering-magnet;
a plurality of Gemini's linear actuators being configured to form a Gemini-magnet by sliding the J-magnet and the E-magnet toward each other and splitting the Gemini-magnet by sliding the J-magnet and the E-magnet away from each other along at least one Gemini shaft;
a plurality of buffers' linear actuators configured to split the at least one pair of buffers apart by sliding the buffers away from each other and joining the at least one pair of buffers together by sliding the buffers toward each other along at least one buffers' shaft;

at least one pair of buffers disposed between the stagnant-magnet and the opposite end of the wandering-magnet, wherein the wandering-magnet moves from the first position to the second position by joining the E-magnet and the J-magnet together and splitting the at least one pair of buffers apart, and wherein the wandering-magnet moves from the second position to the first position by splitting the E-magnet and the J-magnet apart and joining the at least one pair of buffers together; and an energy converter adapted to generate electrical energy from movements of the wandering-magnet from the first position to the second position and vice versa.

2. The magnets-based generator of claim 1, further provided with a controller configured to control the movements of the wandering-magnet from the first position to the second position and vice versa.

3. The magnets-based generator of claim 2, wherein the controller comprises a rectifier and a regulator configured to regulate charging current to batteries that are used for storing energy.

4. The magnets-based generator of claim 1, wherein the E-magnet and the J-magnet are joined together to form a Gemini magnet.

5. The magnets-based generator of claim 4, wherein splitting the at least one pair of buffers apart causes the stagnant-magnet and the wandering-magnet to repel each other and joining the E-magnet and the J-magnet together causes the wandering-magnet and the Gemini magnet to attract each other, thereby propelling the wandering-magnet from the second position to the first position.

6. The magnets-based generator of claim 4, wherein the at least one pair of buffers are joined together to cause the wandering-magnet to be attracted to the at least one pair of buffers and the E-magnet and the J-magnet are split apart to weaken an attraction between the wandering-magnet and the Gemini magnet, thereby propelling the wandering-magnet from the first position to the second position.

7. The magnets-based generator of claim 4, further comprising a plurality of pulleys supporting a plurality of belts that connect the at least one pair of buffers to the Gemini magnet, wherein the buffers assist in splitting the Gemini magnet to the E-magnet and the J-magnet.

8. The magnets-based generator of claim 7, wherein the controller sequentially controls the sliding of the plurality of buffers' linear actuators and the plurality of Gemini's linear actuators.

9. The magnets-based generator of claim 4, further comprising an auxiliary magnet configured to assist the Gemini magnet in propelling the wandering magnet from the second position to the first position.

10. The magnets-based generator of claim 1, further comprising a plurality of energy accumulators connecting the buffers to the chassis to allow movements of the buffers when the energy is released.

11. The magnets-based generator of claim 10, wherein the energy accumulators are a plurality of gas springs disposed parallel to the buffers' shaft, wherein at least one gas spring of the plurality of gas springs connects one side of the chassis to one buffer of the pair of buffers that is closer to an opposite side of the chassis, and wherein another at least one gas spring of the plurality of gas springs connects the opposite side of the chassis to a second buffer of the pair of buffers that is closer to the one side of the chassis and wherein the plurality of gas springs are compressed by the at least one pair of buffers while the pair of buffers are joined together, and wherein the plurality of gas springs are extracted to assist splitting the at least one pair of buffers apart.

12. The magnets-based generator of claim 1, further comprising a plurality of carriage energy accumulators configured to accumulate energy while the wandering-magnet sub-assembly moves from the second position to the first position and release their energy, when extracted, to assist propelling the wandering-magnet sub-assembly from the first position to the second position.

13. The magnets-based generator of claim 12, wherein the energy accumulators are gas springs that are compressed to store energy.

14. The magnets-based generator of claim 13, further comprising a member connecting between the carriage and the energy converter, thereby following the movements of the wandering-magnet from the first position to the second position and vice versa.

15. The magnets-based generator of claim 14, wherein the energy converter comprises a linear to rotational gear configured to convert back and forth linear movements of the member to rotate a rotor of an alternator.

16. The magnets-based generator of claim 15, wherein the energy converter further comprises a unidirectional bearing and a spiral spring configured to accumulate energy resulting from the movements of the wandering-magnet for maintaining a continuous rotational speed of the rotor.

* * * * *